United States Patent [19]
Gottfried

[11] Patent Number: 6,074,714
[45] Date of Patent: *Jun. 13, 2000

[54] FIRE AND HEAT PROTECTION WRAP FOR STRUCTURAL STEEL COLUMNS, BEAMS AND OPEN WEB JOISTS

[75] Inventor: Samuel Gottfried, Riverdale, N.Y.

[73] Assignee: No Fire Technologies, Inc., Upper Saddle River, N.J.

[*] Notice: This patent is subject to a terminal disclaimer.

[21] Appl. No.: 09/146,645

[22] Filed: Sep. 3, 1998

Related U.S. Application Data

[63] Continuation-in-part of application No. 08/862,833, May 23, 1997, Pat. No. 5,985,385.
[51] Int. Cl.[7] .................. B32B 1/08; F16L 11/02
[52] U.S. Cl. .................. 428/34.6; 405/157; 405/216; 428/34.7; 428/36.91; 428/920; 442/117; 442/138
[58] Field of Search .................. 428/34.6, 34.7, 428/36.91, 920; 405/157, 216; 442/117, 138

[56] References Cited

U.S. PATENT DOCUMENTS

| | | | |
|---|---|---|---|
| 5,319,155 | 6/1994 | Maroist | 174/28 |
| 5,442,131 | 8/1995 | Borgwarth | 174/15.6 |
| 5,660,899 | 8/1997 | Rockney et al. | 428/34.7 |
| 5,681,640 | 10/1997 | Kiser | 428/181 |
| 5,985,385 | 11/1999 | Gottfried | 428/34.6 |

Primary Examiner—Blaine Copenheaver
Attorney, Agent, or Firm—Ezra Sutton

[57] ABSTRACT

A fire and heat protection wrapping system is described for wrapping structural steel such as steel columns, beams and open web joists used in steel construction of all types of edifices. The protection wrapping system includes a concentric composite laminate structure having a plurality of concentric layers for the protection of structural steel components which are exposed to high temperatures of up to five hours (5 hrs) in duration. The plurality of concentric layers includes an outer first layer, an inner second layer, an inner third layer and an inner core fourth layer for wrapping the structural steel component. The outer first layer is a fiberglass textile having an intumescent coating resistant to heat, water and impact. The inner second layer is a metal foil layer for reflecting heat and eliminates the convection transfer of heat. The inner core third layer is a low conductivity refractory blanket for reducing the transmission of heat. The inner core fourth layer is a metal foil layer for reflecting heat and eliminating the convection transfer of heat.

39 Claims, 13 Drawing Sheets

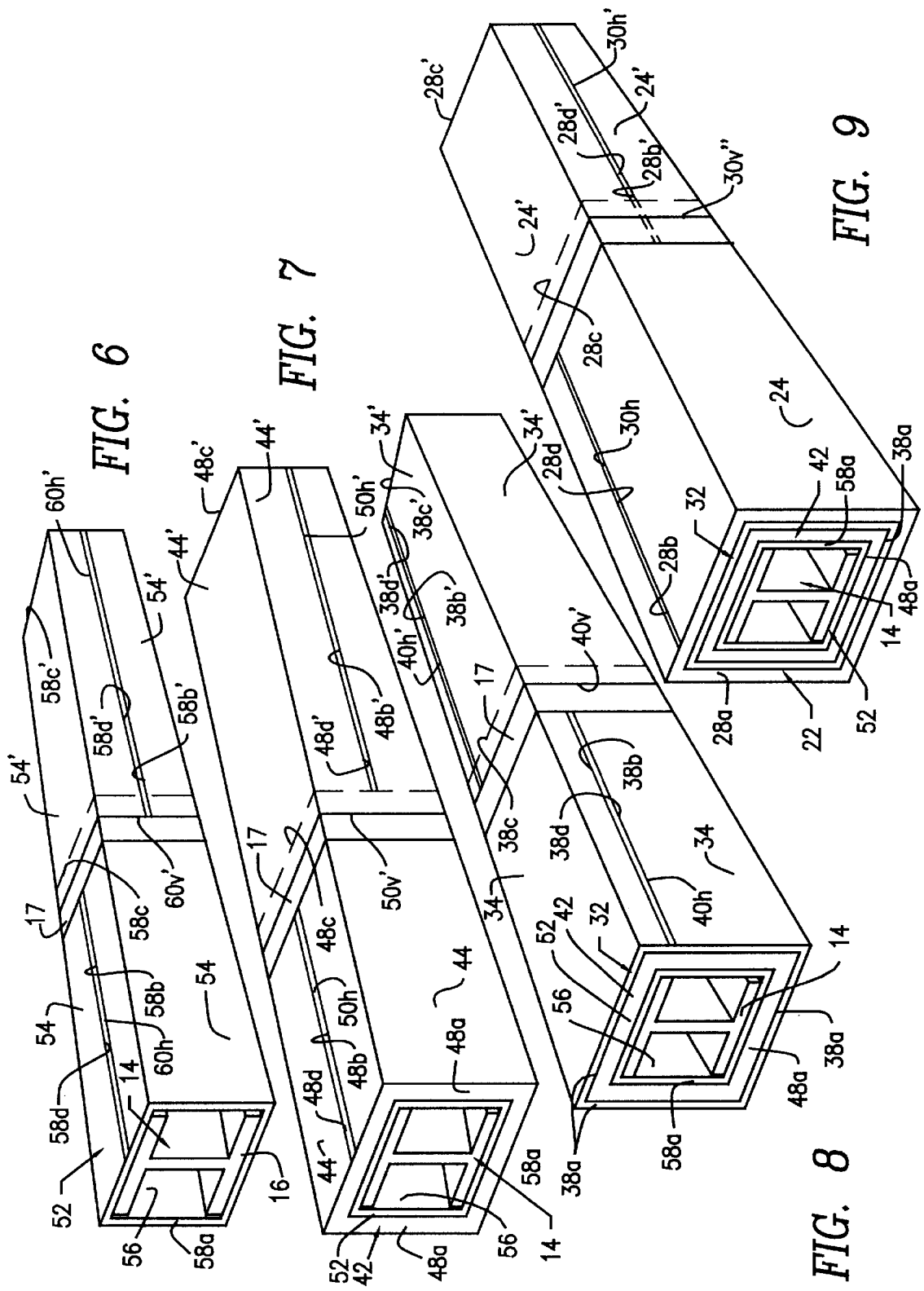

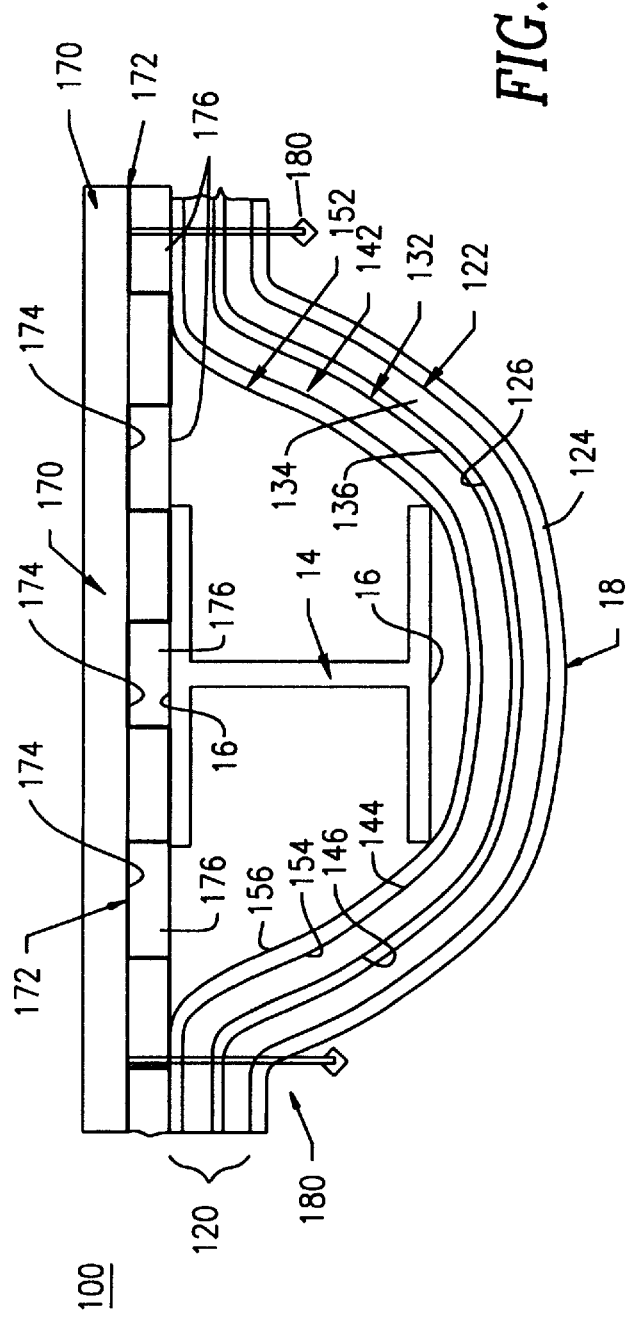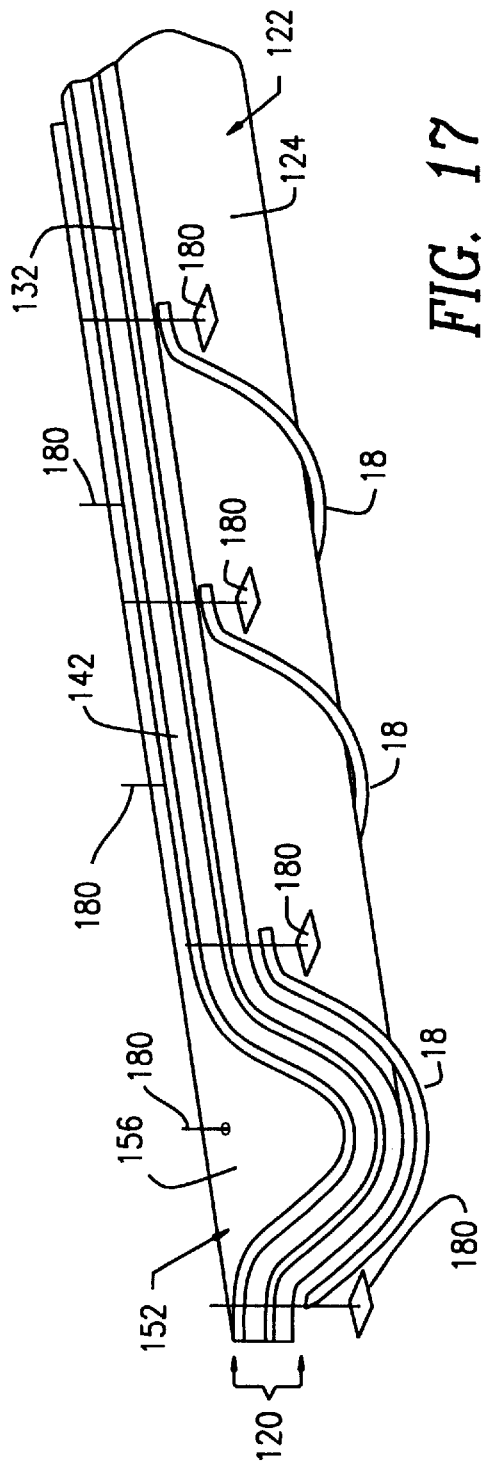

FIRE AND HEAT PROTECTION WRAP FOR STRUCTURAL STEEL COLUMNS, BEAMS AND OPEN WEB JOISTS

RELATED APPLICATION

This application is a continuation-in-part U.S. application Ser. No. 08/862,833, filed May 23, 1997, now U.S. Pat. No. 5,985,385.

FIELD OF THE INVENTION

The present invention relates to a fire and heat protection wrapping system for structural steel columns, beams and open web joists. More particularly, the new and improved thermal protection wrapping system includes a concentric composite laminate structure having a plurality of concentric layers for the protection of structural steel in applications where there is exposure to high temperature up to five (5) hours in duration.

BACKGROUND OF THE INVENTION

Fire and heat protection for structural steel has been provided by four major types of systems: cementitious spray coatings, sheet rock framing, intumescent spray coatings and concrete encapsulation. Protection is provided at temperatures up to 2300° F. for periods of one-half hour (½ hour) to four hours (4 hrs). Typical structural steel systems requiring such protection include columns, beams and open web joists in houses, buildings, factories and many other types of construction. In addition to land based systems, protection is required for structural steel in off shore drilling platforms, oil and gas pipelines and other marine based systems.

The four basic systems currently used to protect structural steel from fire and heat are described as follows:

1. Cementitious—This spray on material, is a "cement like" fibrous mass of inorganic products combined with water and air to provide adhesion to the steel. It has a relatively high insulation value and heat capacity.

2. Sheet Rock/Framing—The structural steel component is framed typically with wood or metal studs, and one to two layers of gypsum wallboard (sheet rock) installed on the framing.

3. Intumescent—These materials are coatings, sprayed directly on the steel, which expand when exposed to fire. The expansion results in an insulated layer, which provides the fire protection.

4. Concrete—This provides a very large, heavy and high heat capacity mass which "absorbs" much of the incident heat to provide the steel protection.

These techniques have one or more of the following disadvantages associated with their use:

1. Expensive materials.
2. Labor intensive to install, requiring multiple operations, and evacuation of the job site during application.
3. Messy, hazardous and environmentally unfriendly airborne particles and residues.
4. Heavy.
5. Bulky, requiring substantial space.
6. Unattractive appearance, requiring additional decorative treatments.
7. Short lived, requiring removal, reinstallation or loss of fire protection.

In most applications in land based systems, the only important criterion for selection of a fire protection system is cost. Thus in most cases, the fire protection system selected is cementitious spray on fireproofing. However these materials are very messy involving potentially hazardous and environmentally unsafe components, require the evacuation of the job site for long periods of time during application, require substantial clean-up, are very unattractive and inappropriate for structural steel that is normally in plain view. Additionally, they tend to flake off over time causing potentially hazardous airborne particles, exposing unprotected areas on the steel.

Currently there is no single thermal protection wrapping system having all of the following desirable features:

1. Low cost of materials
2. Low cost and simple installation requiring only one step
3. No evacuation of job site required during installation
4. No clean-up required after completion
5. No hazardous or messy components
6. Completely dry installation
7. No environmentally unfriendly materials
8. Lasts indefinitely with no flaking or peeling, requiring no maintenance
9. Attractive appearance, available in many colors and styles
10. Light weight
11. Small size and small "foot print"
12. Easily removable and replaceable for easy access to steel structure when necessary
13. Adaptable to all sizes of columns, beams and open web joists There remains a need for a new and improved thermal protection system that would provide substantial protection from fire and heat to structural steel columns, beams and joists for a long duration of time if a fire were to occur without adding a large amount to the cost, size, weight and hazards. In addition, the thermal protection system should be easy to install, durable, attractive, easy to remove and adaptable for use on many configurations, types and sizes of columns, beams and open web joists.

DESCRIPTION OF THE PRIOR ART

Fire and thermal protection systems of various designs, configurations and materials of construction have been disclosed in the prior art. There are four basic systems currently in use:

1. Cementitious Spray On
2. Sheet Rock/Framing
3. Intumescent Spray On
4. Concrete Encapsulation A. There are numerous examples of cementitious spray on fireproofing. For example U.S. Pat. No. 4,254,177 and 4,349,494 disclose a material named Monokote, developed by W. R. Grace and Co. and additional materials are distributed by Carboline Co. and Kafco. The characteristics of these materials are all similar, as they involve a spray of fibrous mass on to the steel structure, to a thickness of 0.5 to 2 inches, depending on steel size and length of protection required.

B. Framing techniques and sheet rock have also been used for many years and are disclosed in the art. This technique usually involves wood framing around a column, followed by installation of one or two layers of gypsum wallboard (sheet rock). The sheet rock must have edging installed, and then taping and compound to join the seams. This is followed by multiple operations of compounding, smoothing, sanding and more smoothing to prepare a suitable surface for painting or wallpaper. The cost of installation of this type of fireproofing makes it suitable only for columns that are exposed to view, or in buildings where spraying is prohibited. Additionally, the large size of the frame reduces available floor space, especially significant on the floor of a building with numerous columns.

C. Intumescent spray is a relatively new fireproofing technique. There are several intumescent materials that have been approved for structural steel. Intumescent fire-retardant coating materials have been disclosed in U.S. Pat. Nos. 4,879,320 and 4,965,296. More recently, a high performance intumescent material has been disclosed by NoFire Technologies in U.S. Pat. No. 5,723,515. While this fireproofing technique provides a very thin, light weight and attractive alternative, the major problems are high cost, and very intensive and complex application requiring a large number of steps including preparation.

The high cost is a major deterrent, and usually eliminates this technique from consideration except in minor instances where a "painted column look" is specified by an architect for columns that are ordinarily exposed to view. In some cases, intumescents are solvent based and contain hazardous materials requiring precautions as well as job site evacuation.

D. Concrete encapsulation is perhaps the oldest technique of fireproofing structural steel. This requires a column to be entirely encased in a large mass of concrete, which provides a high heat capacity. Aside from the very substantial weight and size added to the column, the concrete requires intensive labor to complete the installation. This technique is the most expensive, and used in circumstances where columns require very high durability to constant impacts, such as in parking garages.

A variation of a fireproofing technique involving the wrapping of structural steel has recently been disclosed by Kiser, U.S. Pat. No. 5,681,640. In this technique, there are multiple layers of intumescent and other fireproofing materials using a multiple folding technique to encapsulate sufficient intumescent material to achieve the fire protection. This multiple fold technique is relatively complex, expensive and bulky.

The prior art does not disclose the particular structure and design of the thermal protection wrapping system of the present invention.

Accordingly, it is an object of the present invention to provide a fire and thermal protection wrapping system for structural steel components and systems, including columns, beams and open web joists which is effective at continuously maintained temperatures up to 2300° F. for up to five hours (5 hrs) in duration.

Another object of the present invention is to provide a fire and thermal protection wrapping system that is easy to install and can be used on all types and sizes of structural steel columns, beams and open web joists.

Another object of the present invention is to provide a fire and thermal protection wrapping system that is thin and light weight, and can be easily adapted on the job site to all types and sizes of structural steel configurations.

Another object of the present invention is to provide a fire and thermal protection wrapping system that is durable, and can be protected against severe environmental conditions of water, impact, temperature fluctuations of extreme hot and cold and humidity.

Another object of the present invention is to provide a fire and thermal protection wrapping system that has multiple industry facility applications for operational use that includes: residential, business, commercial, land based, off shore and marine environment; oil, gas and chemical pipelines; military installations, airports and the like.

Another object of the present invention is to provide a fire and thermal protection wrapping system that provides protection using a novel combination of radiation and heat reflection with low thermal conduction.

Another object of the present invention is to provide a fire and thermal protection wrapping system that is low cost, easily installed, requires only one step, does not require evacuation of the job site during installation, and requires no clean-up after completion.

Another object of the present invention is to provide a fire and thermal protection wrapping system that is safe, non-toxic, non-hazardous, environmentally safe and has a completely dry installation.

Another object of the present invention is to provide a fire and thermal protection wrapping system that has an attractive appearance, and is available in many colors, trims and finishes.

Another object of the present invention is to provide a fire and thermal protection wrapping system that can be used on structures that are difficult to protect, such as open web joists.

Another object of the present invention is to provide a fire and thermal protection wrapping system that includes a concentric composite laminate structure having a plurality of layers for the protection of structural steel components being wrapped.

Another object of the present invention is to provide a fire and thermal protection wrapping system that provides a plurality of protection layers including a heat reflection outer shell, an inner reflective lining, a low thermal conductive layer and a metal foil layer surrounding the structure steel component.

Another object of the present invention is to provide a fire and thermal protection wrapping system that provides a plurality of protection layers including a heat reflection outer shell, an inner reflective lining, and a low thermal conductive layer surrounding the structure steel component.

Another object of the present invention is to provide a fire and thermal protection wrapping system that provides a plurality of protection layers including a heat reflection outer shell, and an inner reflective lining surrounding the structure steel component.

Another object of the present invention is to provide a fire and thermal protection wrapping system that can be easily applied and mass produced in an automated and economical manner, and is cost efficient for a variety of applications.

SUMMARY OF THE INVENTION

In accordance with the present invention, there is provided a fire and thermal protection wrapping system for wrapping structural steel columns, beams, open web joists and the like. The thermal protection wrapping system includes a concentric component laminate structure having a plurality of concentric layers for the protection of the structural steel components which are exposed to high temperature for up to five hours (5 hrs) in duration.

The plurality of concentric layers includes an outer first layer, an inner second layer, an inner third layer and an inner fourth layer for wrapping the structural steel component.

The outer first layer is a fiberglass textile having an intumescent coating for resistance to heat, water and impact; and the outer first layer surrounds the inner second layer and has an inner surface wall in contact with the inner second layer.

The inner second layer is a metal foil layer for reflecting heat and eliminating the convective transfer of heat, and the inner second layer surrounds the inner third layer and has an inner surface wall in contact with the inner third layer.

The inner third layer has a low conductivity refractory blanket for reducing the transmission of heat; and the inner third layer surrounds the inner fourth layer and has an inner surface wall in contact with the inner fourth layer.

The inner fourth layer is a metal foil layer for reflecting heat and eliminating the convective transfer of heat, and the inner fourth layer surrounds the structural steel component and the inner fourth layer has an inner surface wall in contact with the structural steel component.

BRIEF DESCRIPTION OF THE DRAWINGS

Further objects, features and advantages of the present invention will become apparent upon consideration of the detailed description of the presently preferred embodiments, when taken in conjunction with accompanying drawings wherein:

FIG. 6 is a front perspective view of the thermal protection wrapping system of the present invention showing the inner core fourth layer attached to the outer surface wall of the structural steel column in completing the first assembling step for forming the concentric composite laminate structure;

FIG. 7 is a front perspective view of the thermal protection wrapping system of the present invention showing the inner third layers attached to the outer surface walls of the inner core fourth layers in completing the second assembling step for forming the concentric composite laminate structure;

FIG. 8 is a front perspective view of the thermal protection wrapping system of the present invention showing the inner second layer attached to the outer surface walls of the inner third layer in completing the third assembling step for forming the concentric composite laminate structure;

FIG. 9 is a front perspective view of the thermal protection wrapping system of the present invention showing the outer first layer attached to the outer surface wall of the inner second layer in completing the fourth assembling step for the complete formation of the concentric composite laminate structure of the thermal protection wrapping system;

FIG. 15 is a sectional view of the thermal protection wrapping system of the first alternate embodiment of the present invention showing the concentric composite laminate structure having a plurality of multi-ply concentric layers in the assembled state for protecting the structural steel column and deck assembly from fire and heat;

FIG. 17 is a front perspective view of the thermal protection wrapping system of the first alternate embodiment of the present invention showing the multiple concentric layers for forming a multi-ply composite laminate sheet structure in preparation for concentric attachment to the structural steel column and deck assembly by the use of bolt and pin members therein.

DETAILED DESCRIPTION OF THE PREFERRED EMBODIMENT

Figure 1:
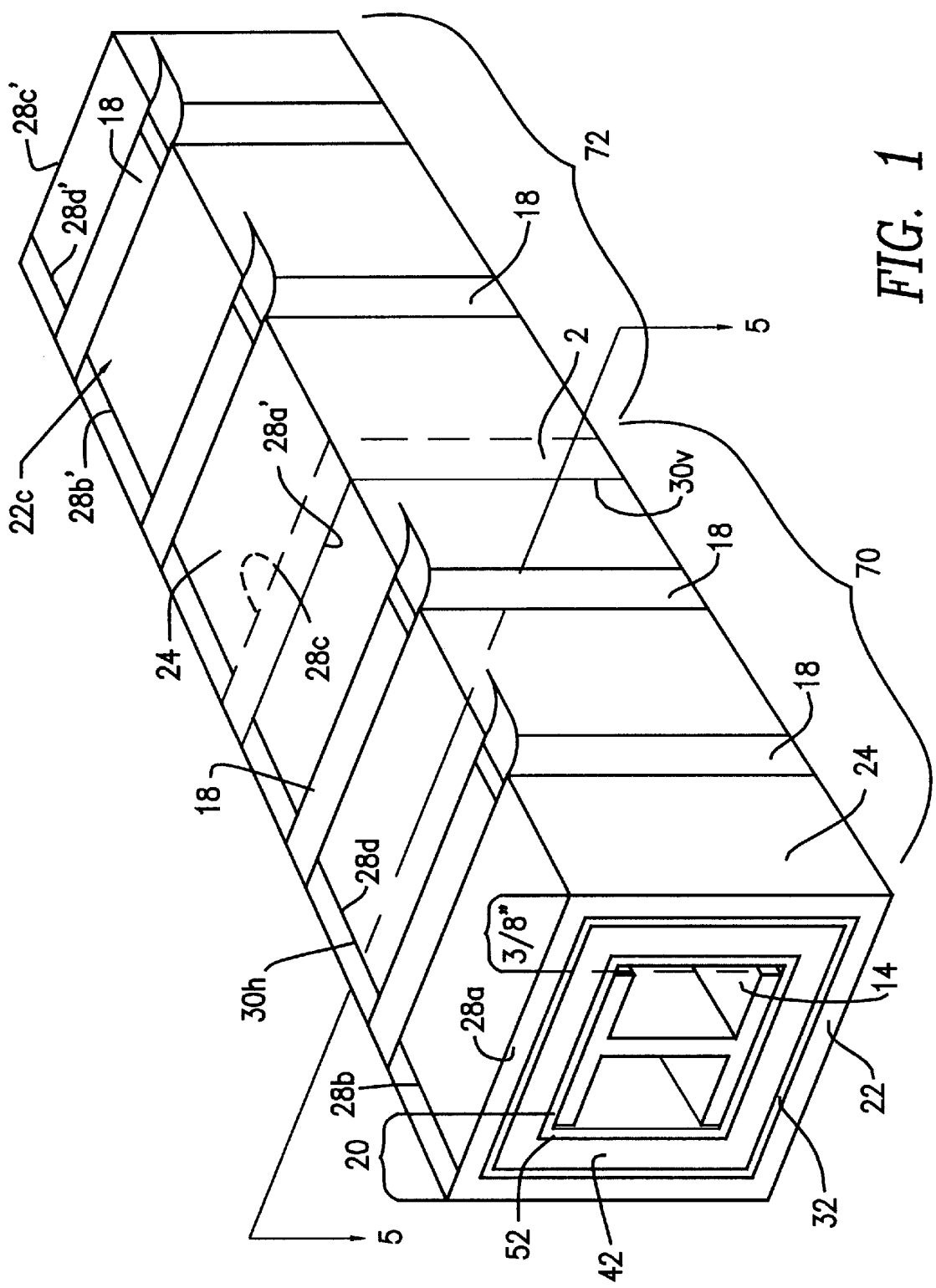
FIG. 1 is a front perspective view of the thermal protection wrapping system of the preferred embodiment of the present invention showing the concentric composite laminate structure having a plurality of concentric layers in the assembled state for protecting a structural steel column from fire and heat.
Figure 2:
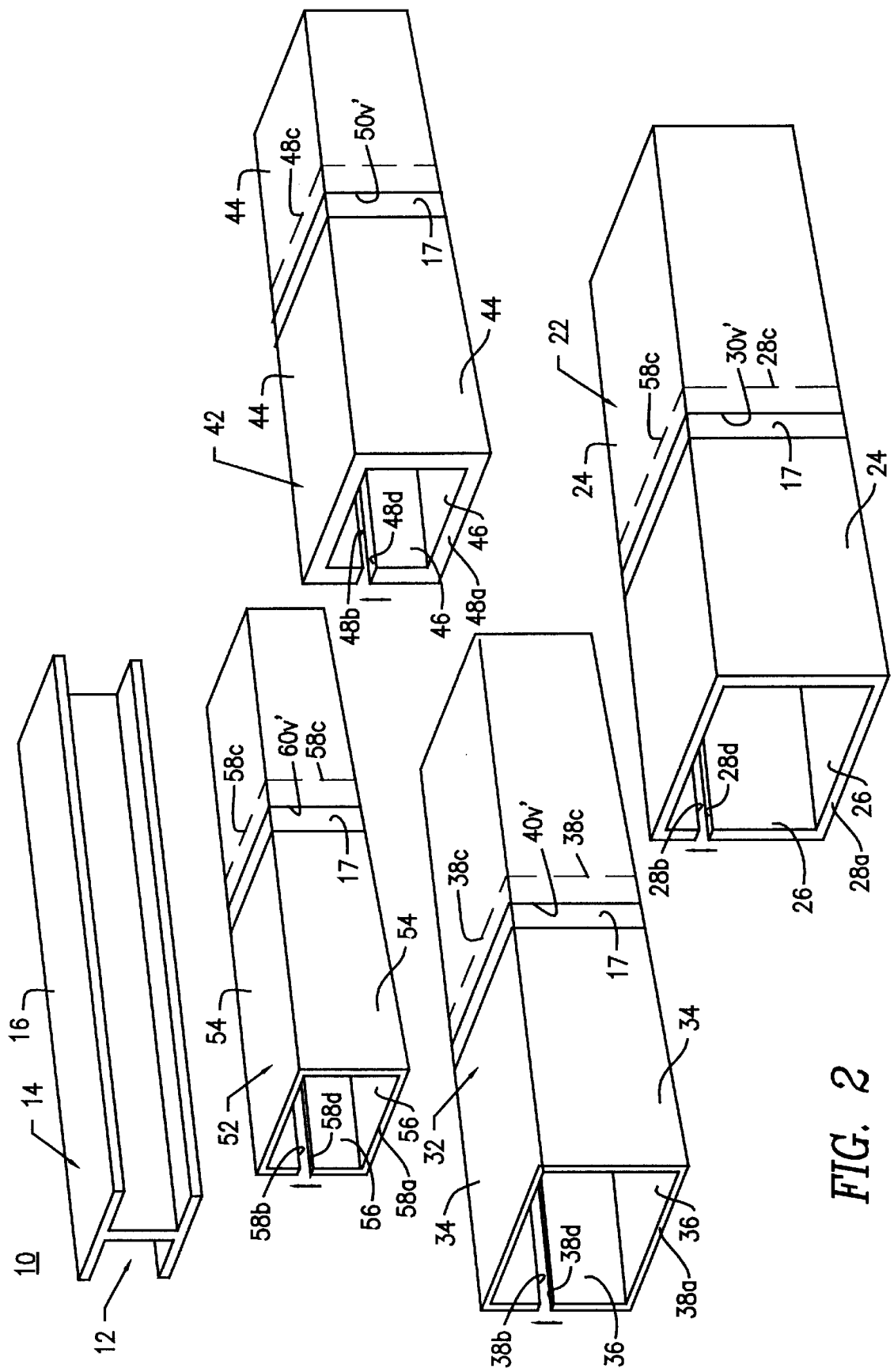
FIG. 2 is an exploded front perspective view of the thermal protection wrapping system of the present invention showing the concentric layers which are the outer first layer, the inner second layer, the inner third layer and the inner fourth layer in preparation for concentric attachment to the structural steel column.
Figure 3:
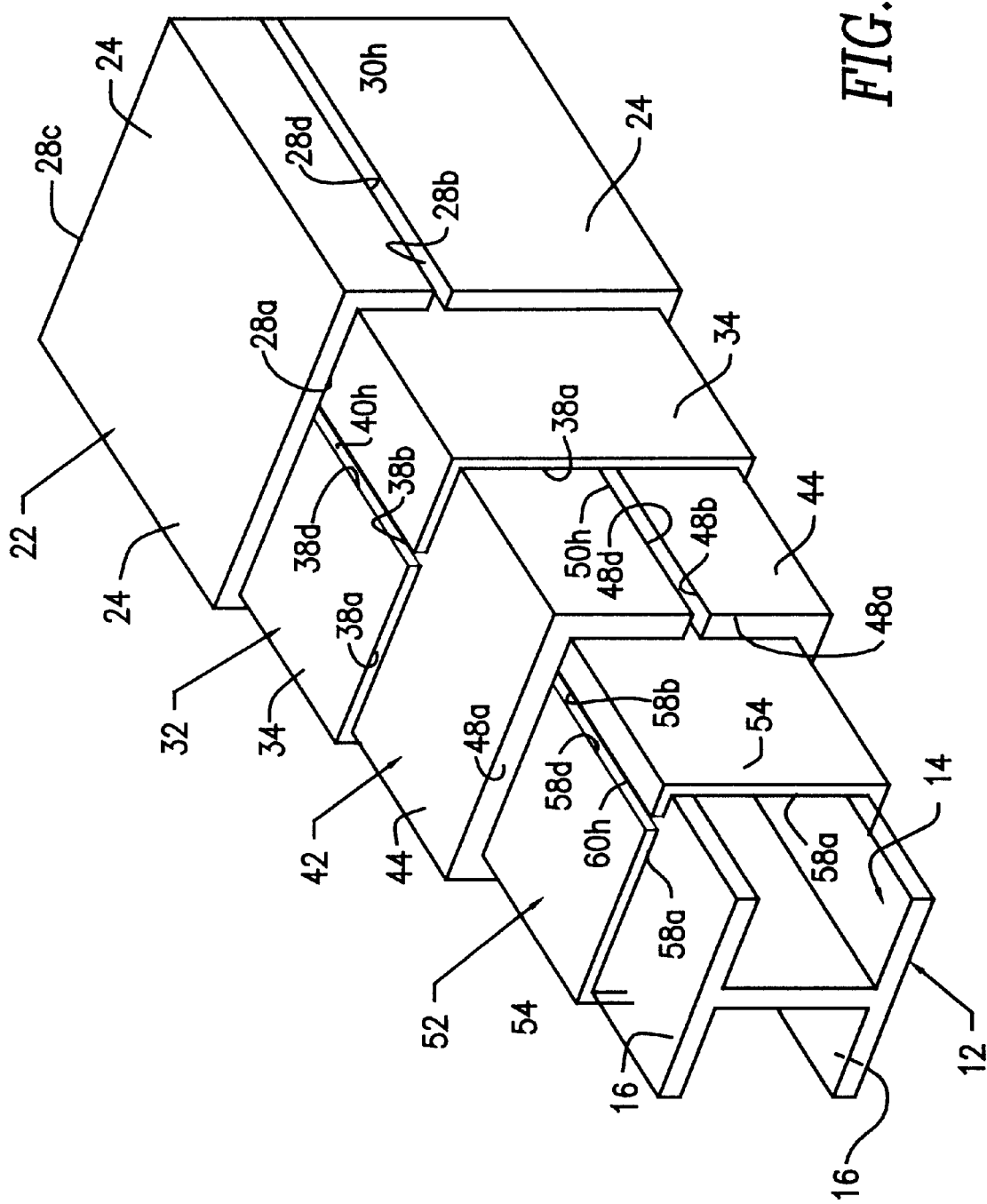
FIG. 3 is an exploded partial front perspective view of the thermal protection wrapping system of the present invention showing the layers in concentric form in an assembled state demonstrating the concentric attachment to the structural steel column.
Figure 4:
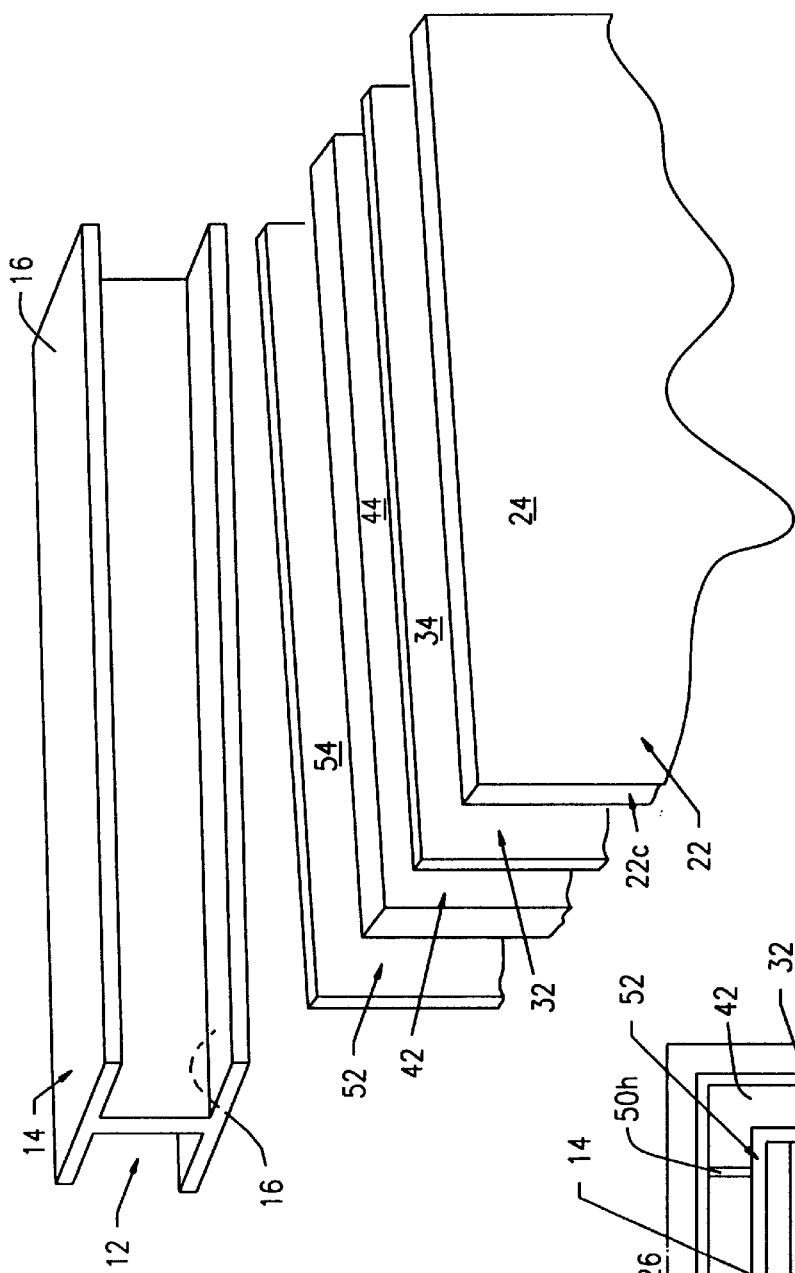
FIG. 4 is an exploded partial front perspective view of the thermal protection wrapping system of the present invention showing the layers in sheet form in an unassembled state being readied for the concentric attachment to the structural steel column.

The preferred embodiment of the present invention provides for a fire and thermal protection wrapping system 10 for the wrapping of a structural steel component 12 having columns/beams 14, open web joists or other steel structures associated with steel construction, as depicted in FIGS. 1 through 10 for a steel column 14 and in FIGS. 11 through 18 for a steel beam 14 and deck assembly 12J. The thermal protection wrapping system 10, as shown in FIGS. 1 and 4, is formed from a four-ply concentric composite laminate structure 20 having a plurality of concentric layers 22, 32, 42 and 52 which provides for the fire and heat protection of the steel structure that is being wrapped. The concentric composite laminate structure 20 includes an outer first layer 22, an inner second layer 32, an inner third layer 42 and an inner fourth layer 52 attached to the outer surface steel structure 16 of steel beam 14.

The outer first layer 22 includes a fiberglass textile having a fire retardant coating 22C and includes an outer surface wall 24, an inner surface wall 26 and perimeter wall edges 28a, 28b, 28c and 28d. In the assembled states, as shown in FIGS. 1 and 8, perimeter wall edges 28a' and 28c are adjacent and in contact with each other to form vertical contact line 30v; and perimeter wall edges 28b and 28d; 28b' and 28d' are adjacent and in contact with each other to form a horizontal contact lines, butt joints or overlap joints 30h and 30h', respectively. Additionally, in the assembled state, the outer first layer 22 encircles the inner second layer 32 such that the inner surface wall 26 of outer first layer 22 is adjacent to and in contact with the outer surface wall 34 of the inner second layer 32, as shown in FIGS. 1, 2, 3 and 9 of the drawings.

The fire retardant coating 22C on the fiberglass textile 22 is a fire-retardant, intumescent coating consisting of a foaming agent, a blowing agent, a charring agent, a binding agent, a solvent and a pigment; flame spread reduction agents; thermal transmission reductive agents; refractory fibers; and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 22 of the fiberglass textile layer has intumescent coating 22C for resistance to fire, heat, water, impact, and shrinkage.

The inner second layer 32 is a metal foil layer and includes an outer surface wall 34, an inner surface wall 36 and perimeter wall edges 38a, 38b, 38c and 38d. In the assembled state, as shown in FIG. 7, perimeter wall edges 38c and 38a' are adjacent and in contact with each other to form a vertical contact line, butt joint or overlap joint 40v; and perimeter wall edges 38b and 38d; 38b' and 38d' are adjacent and in contact with each other to form horizontal contact lines, butt joints or overlap joints 40h and 40h', respectively. Additionally, in the assembled state, the inner second layer 32 encircles the inner third layer 42 such that the inner surface wall 36 of the second layer 32 is adjacent to and in contact with the outer surface wall 44 of the third layer 42, as shown in FIGS. 2, 3 and 8 of the drawings.

The metal foil layer 32 is used for reflecting heat, as a heat reflector, and eliminates the convection transfer of heat from the steel beam 14 of the structural steel system 12. The metal foil layer 32 is made from sheets formed of steel foil, stainless steel foil or aluminum foil.

The inner third layer 42 is a low thermal conductance, refractory blanket layer and includes an outer surface wall 44, an inner surface wall 46 and perimeter wall edges 48a, 48b, 48c and 48d. In the assembled state, as shown in FIG. 6, perimeter wall edges 48c and 48a' are adjacent and in contact with each other to form a vertical contact line, butt joint or overlap joint 50v; and perimeter wall edges 48b and 48d; 48b' and 48d' are adjacent and in contact with each other to form horizontal contact lines, butt joints or overlap joints 50h and 50h', respectively. Additionally, in the assembled state, the third layer 42 encircles the inner core fourth layer 52 such that the inner surface wall 46 of the third layer 42 is adjacent to and in contact with the outer surface wall 54 of the inner core fourth layer 52, as shown in FIGS. 2, 3 and 7 of the drawings.

The low thermal conductance, refractory blanket layer 42 is used for reducing the transmission of heat from the steel beam 14 of the structural steel system 12. The low thermal conductivity refractory blanket layer 42 is selected from the group consisting of ceramic fiber blankets; silicon dioxide and calcium oxide fiber blankets; high silica fiber blankets; fiber glass blankets; mineral wool and rock wool blankets; and equivalents thereof.

Figure 5:
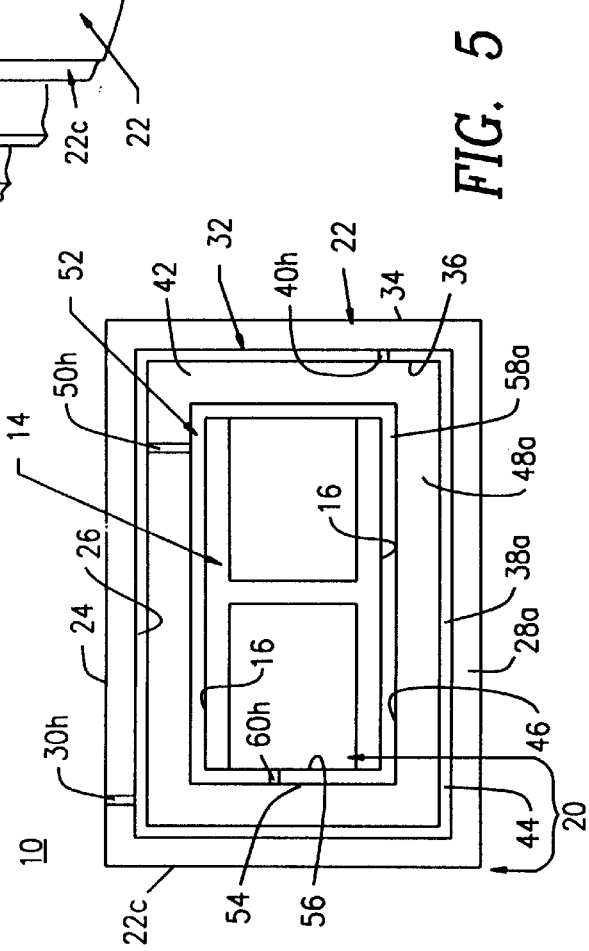
FIG. 5 is an enlarged cross-sectional view of the thermal protection wrapping system of the present invention taken along lines 5—5 of FIG. 1 showing the layers of the concentric composite laminate structure in the assembled state where each layer is concentrically surrounding each inner layer.
Figure 10:
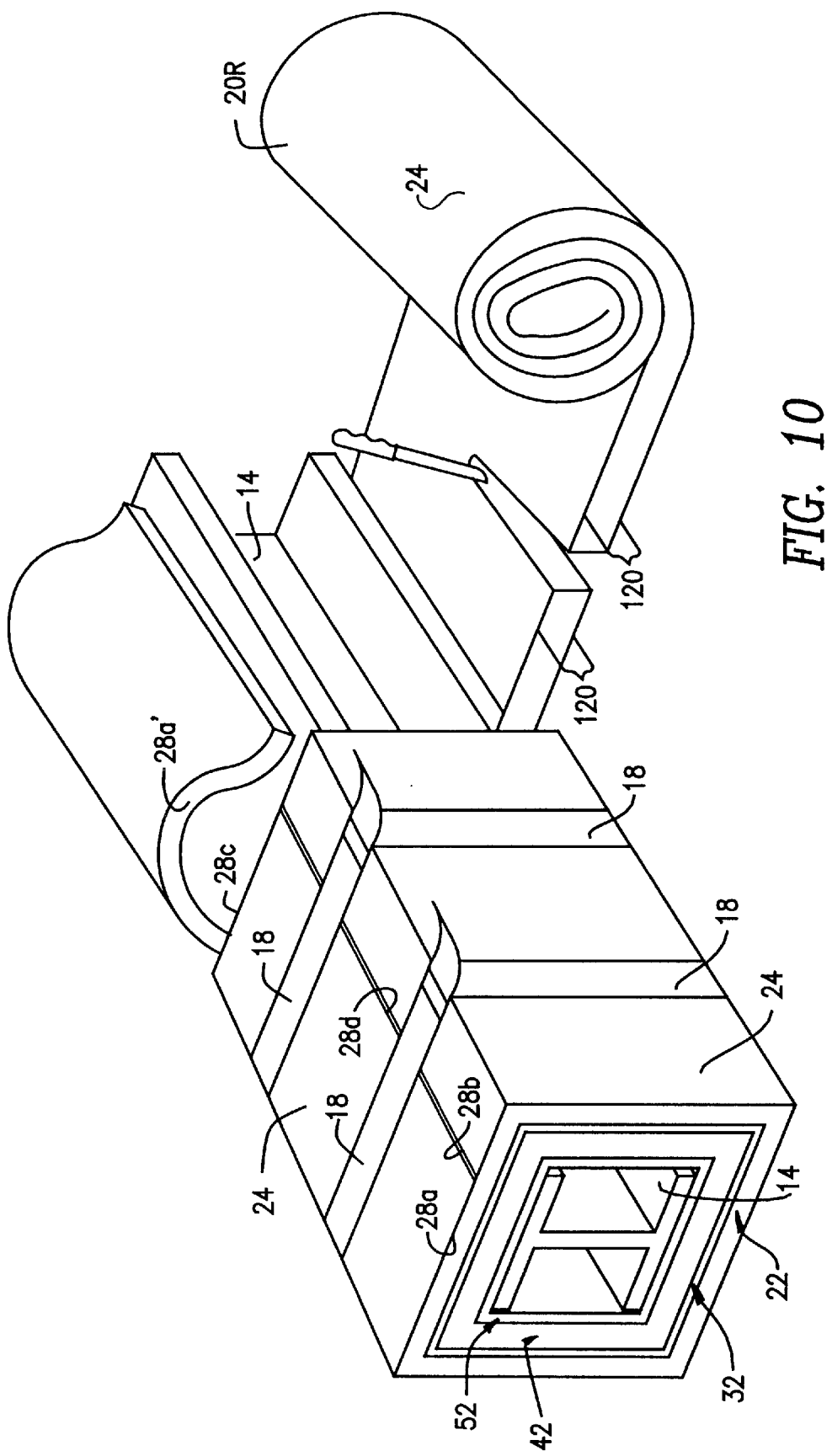
FIG. 10 is a front perspective view of the thermal protection wrapping system of the present invention showing the layered sheet composite structure having a composite rolled package assembly being wrapped around a structural steel column in preparation for protecting the structural steel column from fire and heat.

The inner core fourth layer 52 is a metal foil layer and includes an outer surface wall 54, an inner surface wall 56 and perimeter wall edges 58a, 58b, 58c and 58d. In the assembled state, as shown in FIG. 6, perimeter wall edges 58c and 58a' are adjacent and in contact with each other to form a vertical contact line, butt joint or overlap joint 60v; and perimeter wall edges 58b and 58d; 58b' and 58d' are adjacent and in contact with each other to form horizontal contact lines, butt joints or overlap joints 60h and 60h', respectively. Additionally, in the assembled state, the inner core fourth layer 52 encircles the steel beam 14, such that the inner surface wall 56 of the inner core fourth layer 52 is adjacent to and in contact with the outer surface wall 16 of the steel beam 14, as shown in FIGS. 3, 5 and 6 of the drawings.

The metal foil layer 52 is used for reflecting heat, as a heat reflector, and eliminates the convection transfer of heat from the steel beam 14 of the structural steel system 12. The metal foil layer 52 is made from sheets formed of steel foil, stainless steel foil or aluminum foil.

DETAILED DESCRIPTION OF THE ALTERNATE EMBODIMENT 100

Figure 11:
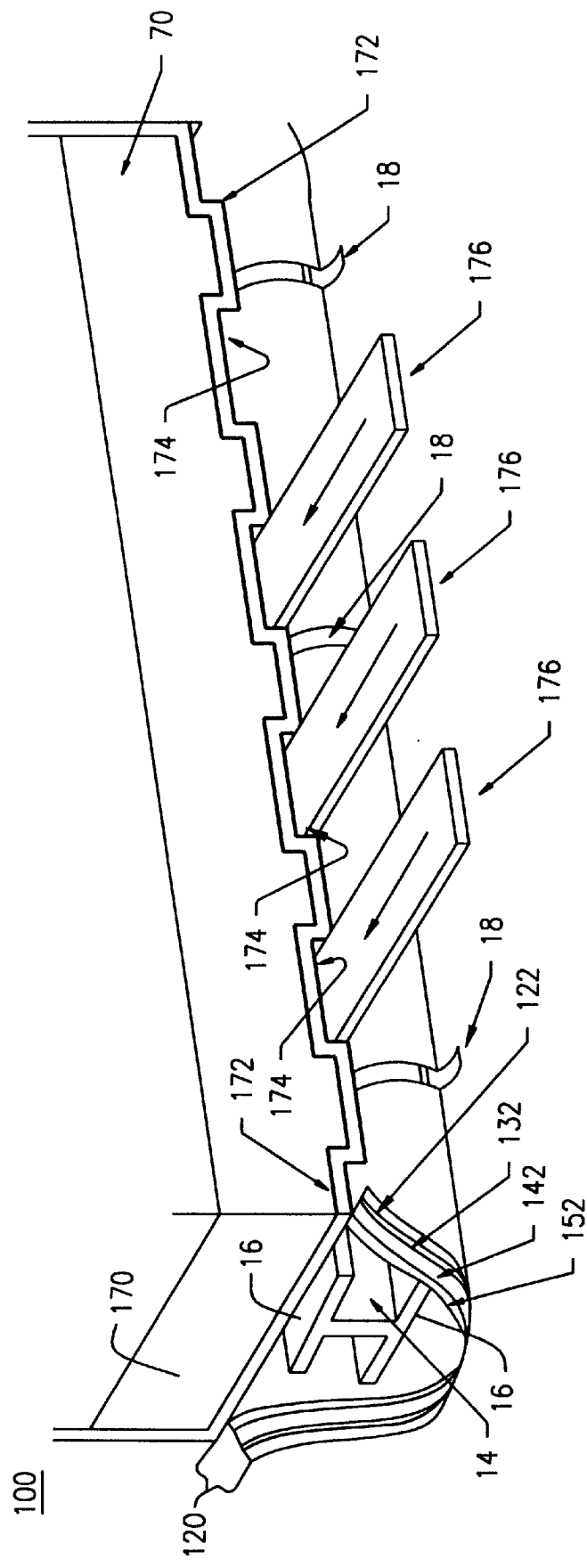
FIG. 11 is a front perspective view of the thermal protection wrapping system of the alternate embodiment of the present invention showing the concentric composite laminate structure having a plurality of concentric layers in the assembled state for protecting a structural steel column and deck assembly from fire and heat.
Figure 12:
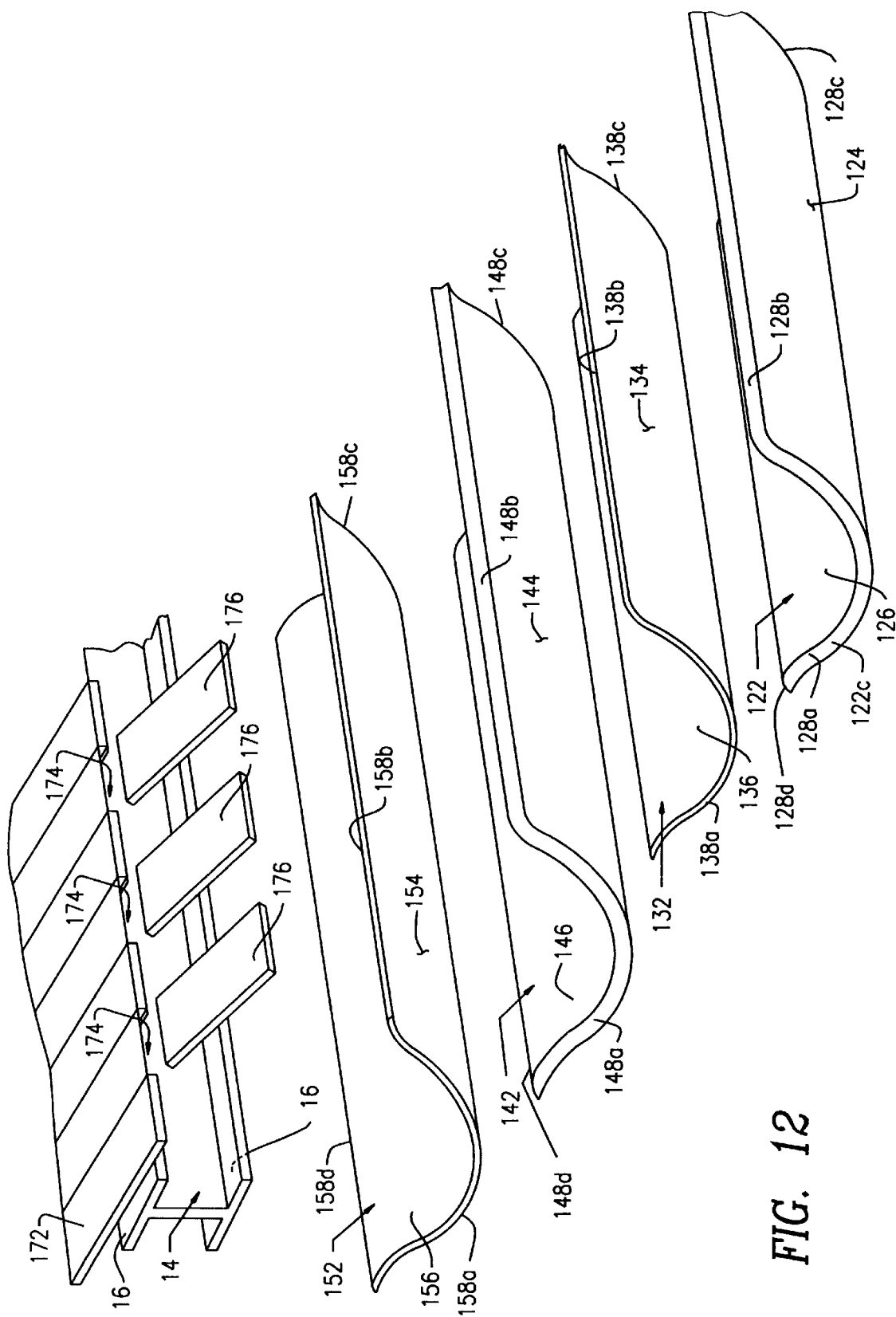
FIG. 12 is an exploded front perspective view of the thermal protection wrapping system of the alternate embodiment of the present invention showing the concentric layers which are the outer first layer, the inner second layer, the inner third layer and the inner core fourth layer in preparation for concentric placement and attachment to the structural steel column and deck assembly.
Figure 13:
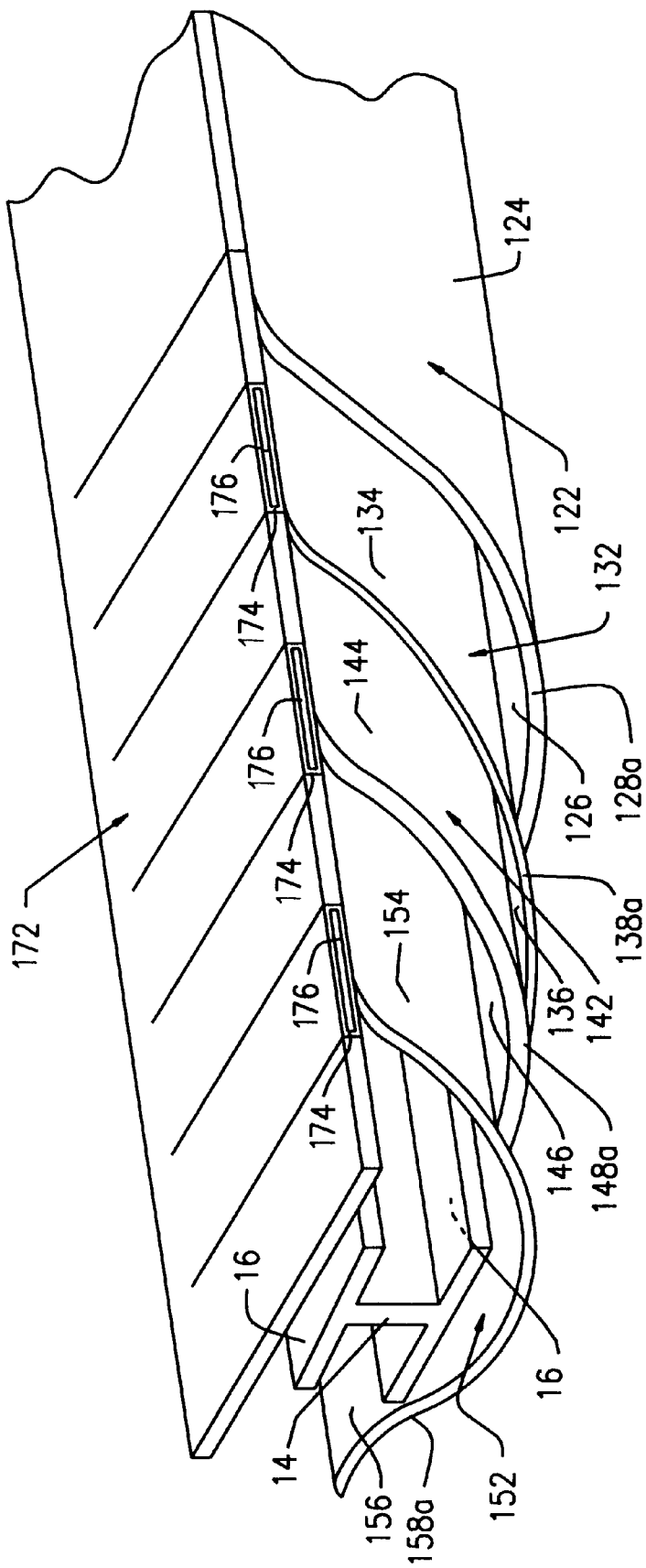
FIG. 13 is an exploded front perspective view of the thermal protection wrapping system of the alternate embodiment of the present invention showing the concentric layers which are the outer first layer, the inner second layer, the inner third layer and the inner core fourth layer in preparation for concentric attachment to the structural steel column and deck assembly.
Figure 14:
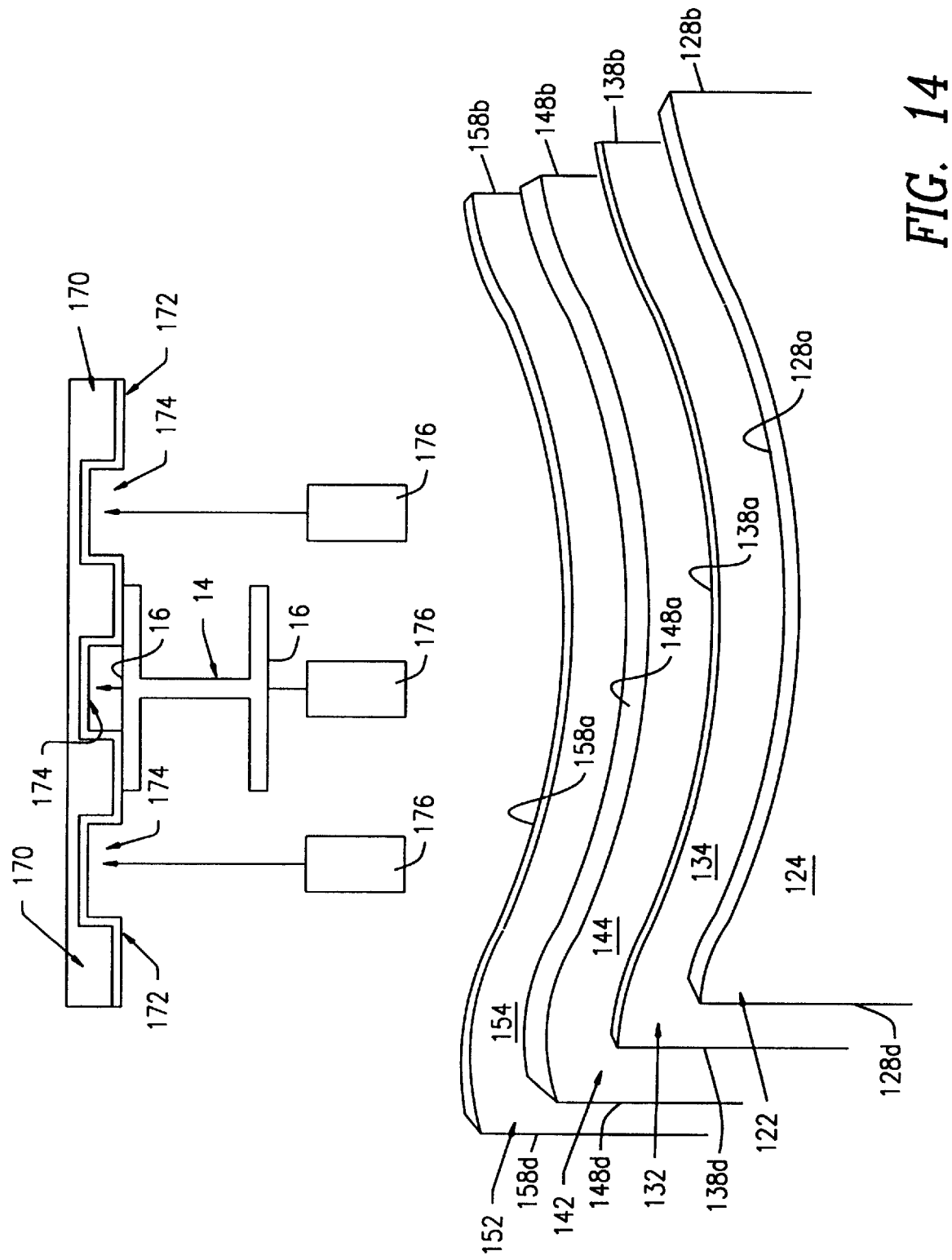
FIG. 14 is an exploded partial front perspective view of the thermal protection wrapping system of the alternate embodiment of the present invention showing the layers in sheet form in an unassembled state being readied for the concentric attachment to the structural steel column and deck assembly.
Figure 16:
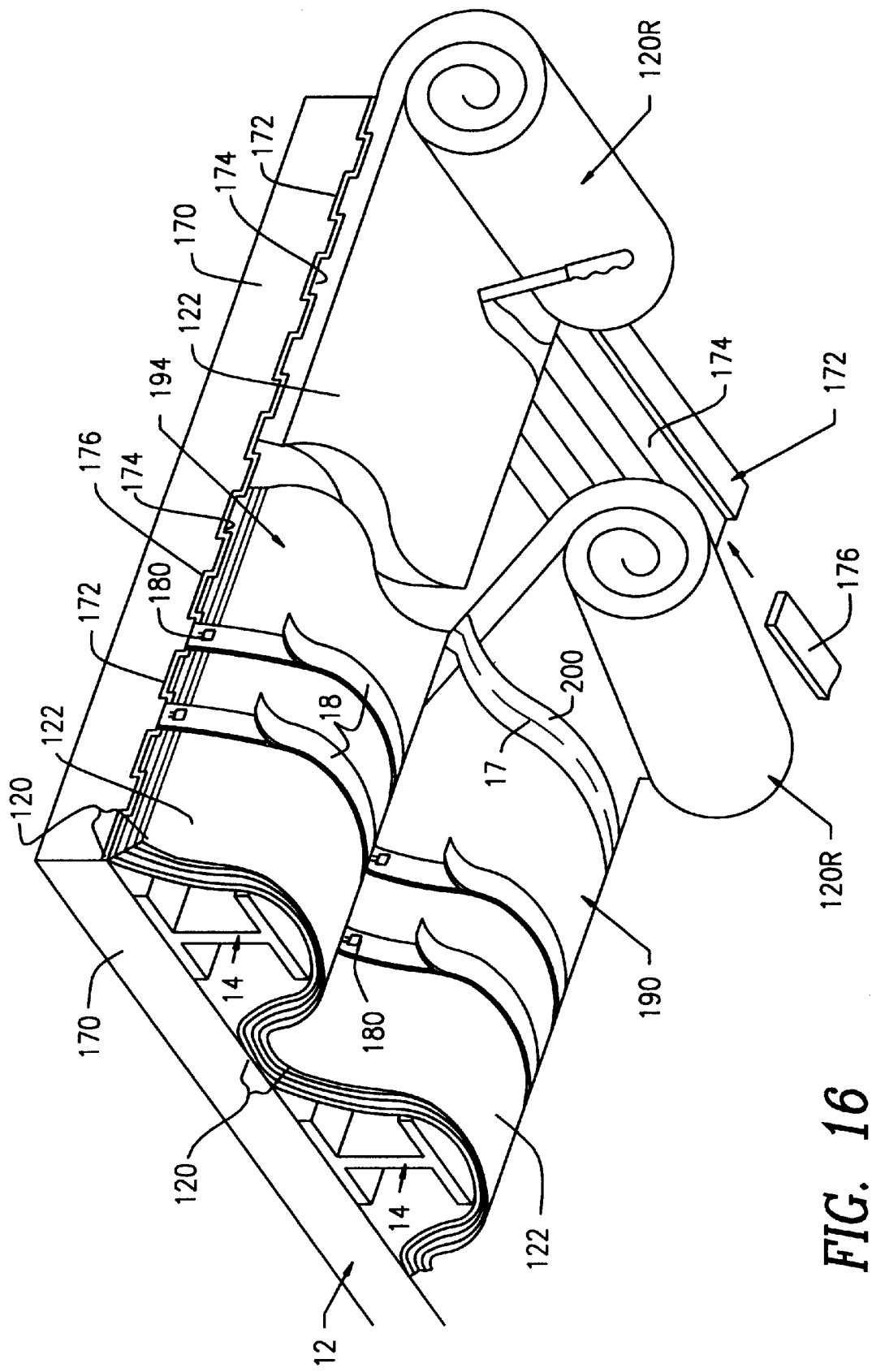
FIG. 16 is a bottom perspective view of the thermal protection wrapping system of the first alternate embodiment of the present invention showing the layered sheet composite structure having a composite rolled package assembly being attached to and covering the structural steel column and deck assembly via bolt and pin members in preparation for protecting the structural steel column and deck assembly from fire and heat.

The fire and thermal open web joist protection wrapping system 100 of the alternate embodiment of the present invention is represented in FIGS. 11 through 18 of the drawings. As shown in FIG. 11, steel beam 14 is enclosed with the open web joist protection wrapping system 100 of the alternate embodiment of the present invention. The open web joist protection wrapping system 100 is used in conjunction with the construction of roadways, bridges, parking decks and the like where concrete 170, steel decking 172, and steel columns 14 are components to the entity being constructed (i.e. a parking deck), wherein the four-ply laminate sheet structure 120 of the open web joist wrap system 100 partially encloses the steel column 14. The open web joist wrap system 100 includes a laminate sheet structure 120 having an outer first layer 122, an inner second layer 132, an inner third layer 142 and an inner fourth layer 152 partially covering the outer surface 16 of the steel column 14, as shown in FIGS. 11, 13 and 15 of the drawings. The laminate sheet structure 120 is attached to the steel decking 172 and concrete 170 via bolt and pin members 180 and steel bands 18, as shown in FIGS. 11, 16 and 17 of the drawings. Steel decking 172 includes a plurality of fluted sections 174 such that the fluted sections 174 have therein ceramic blanket flute fillers 176 for providing further fire protection to the top surface 16 of the steel beam 14 being used.

The outer first layer 122 includes a fiberglass textile having a fire retardant coating 122C and includes an outer surface wall 124, an inner surface wall 126 and perimeter wall edges 128a, 128b, 128c and 128d. In the assembled state, as shown in FIGS. 11 and 15, perimeter wall edges 128a, 138a, 148a and 158a and perimeter wall edges 128c, 138c, 148c and 158c, respectively are adjacent and in contact with each other to form a vertical contact line, butt joint or overlap joint 130v and 140v. Also, perimeter wall edges 128b, 138b, 148b and 158b and perimeter wall edges 128d, 138d, 148d and 158d, respectively are adjacent and in contact with each other to form horizontal contact lines, butt joints or overlap joints 130h and 140h, respectively. Additionally, in the assembled state, the outer first layer 122 partially encircles the inner second layer 132 such that the inner surface wall 126 of outer first layer 122 is adjacent to and in contact with the outer surface wall 134 of inner second layer 132, as shown in FIGS. 11 to 15 of the drawings.

The fire retardant coating 122C on the fiberglass textile 122 is a fire-retardant, intumescent coating consisting of a foaming agent, a blowing agent, a charring agent, a binding agent, a solvent and a pigment; flame spread reduction agents; thermal transmission reductive agents; refractory fibers; and stabilizers. The intumescent coating also includes mechanical enhancer components for physical impact resistance and adhesion enhancement; water resistance agents and efflorescence reduction agents; and elasticity agents to increase resistance to cracking and shrinking, and to also improve ease of spraying and coating. Thus, the outer first layer 122 of the fiberglass textile has intumescent coating 122C for resistance to fire, heat, water impact and shrinkage.

The inner second layer 132 is a metal foil layer and includes an outer surface wall 134, an inner surface wall 136 and perimeter wall edges 138a, 138b, 138c and 138d. In the assembled state, the inner second layer 132 partially encircles the inner third layer 142 such that the inner surface wall 136 of the second layer 132 is adjacent to and in contact with the outer surface wall 144 of the third layer 142, as shown in FIGS. 11 to 15 of the drawings.

The metal foil layer 132 is used for reflecting heat, as a heat reflector, and eliminates the convection transfer of heat from the structural steel beam 14 of the structural steel and deck assembly system 12J. The metal foil layer 132 is made from sheets formed of steel foil, stainless steel foil or aluminum foil.

The inner third layer 142 is a low thermal conductance, refractory blanket layer and includes an outer surface wall 144, an inner surface wall 146 and perimeter wall edges 148a, 148b, 148c and 148d. In the assembled state, the third layer 142 encircles the inner core fourth layer 152 such that the inner surface wall 146 of the third layer 142 is adjacent to and in contact with the outer surface wall 154 of the inner core fourth layer 152, as shown in FIGS. 11 to 15 of the drawings.

The low thermal conductance, refractory blanket layer 142 is used for reducing the transmission of heat from the structural steel beam 14 of the structural steel and deck assembly system 12J. The low thermal conductivity refractory blanket layer 142 is selected from the group consisting of ceramic fiber blankets; silicon dioxide and calcium oxide fiber blankets; high silica fiber blankets; fiber glass blankets; and equivalents thereof.

The inner core fourth layer 152 is a metal foil layer and includes an outer surface wall 154, an inner surface wall 156 and perimeter wall edges 158a, 158b, 158c and 158d. In the assembled state, the inner core fourth layer 152 partially encircles the structural steel column 14 of the structural steel and deck assembly system 12J, such that the inner surface wall 156 of the inner core fourth layer 152 is adjacent to and in contact with the outer surface wall 16 of the steel column 14, as shown in FIGS. 11 to 15 of the drawings.

The metal foil layer 152 is used for reflecting heat, as a heat reflector, and eliminates the convention transfer of heat from the steel column 14 of the structural steel and deck assembly system 12J. The metal foil layer 152 is made from sheets formed of steel foil, stainless steel foil or aluminum foil.

These wrapping systems 10 or 100 are used on most material substrates and are used in severe environmental conditions where heat, cold and humidity are an important factor in the standards in the construction of bridges, parking decks and the like. The fire and heat protection wrapping systems 10 or 100 are used on a variety of material substrates such as iron, steel, aluminum and other metals, composites, plastics, PVC, thermoplastics, epoxies, neoprene, and the like.

EXAMPLES OF USE FOR THE FIRE AND THERMAL PROTECTION WRAPPING SYSTEM

Example 1

Steel Column With a Three (3) Layer Wrap

A W10×49 steel column is prepared for fire testing according to the requirements of ASTM E119. The ends of the column are encased in concrete, and Type K thermocouples are "peened" into the steel at the required locations.

The steel column is wrapped with the Fire and Thermal Protection Wrapping System consisting of: an outer layer of NoFire Textile 2025/S1, a second layer of 0.002 inch stainless steel and a third layer of a 0.25 inch, 8 pound/ft$^3$ density ceramic blanket. The steel column is heated in an oven configuration for 220 minutes, using a time-temperature curve specified in ASTM E119.

The result is an average column temperature of less than 1000° F. and a maximum column temperature of less than 1000° F. for in excess of 220 minutes.

Example 2

Steel Column With a Two (2) Layer Wrap

A steel column W10×49 is prepared for testing identically to the one in Example 1. The column is wrapped with an outer layer of NoFire Textile 2025/S1 and an inner layer of 0.002 inch stainless steel foil. The steel column is heated according to ASTM E119 for 90 minutes.

The result is an average column temperature and maximum column temperature less than 1000° F. for in excess of 90 minutes.

Example 3

Steel Beam With a Four (4) Layer Wrap

A W8×21 beam and 28 gauge deck assembly is prepared for testing according to ASTM E119, as follows: A beam, approximately 40 inches long is installed on top of the oven. A deck is placed on the beam, in the proper orientation. Four inches of sand is poured on top of the deck, which simulates the concrete used in normal configurations.

The beam, which has been "peened" with thermocouples as required by ASTM E119, is wrapped using the NoFire Wrap System consisting of an outer layer of NoFire 2025/ S1, one layer of 0.002 inch stainless steel foil, a layer of 1 inch-8 lb/ft³ ceramic blanket, and 0.002 inch aluminum foil. Thermocouples are placed near the bottom of the sand (in contact with the deck), and near the top of the sand, below the surface.

The beam and deck assembly is heated according to the requirements of ASTM E119 for in excess of 130 minutes. The results demonstrate that the average and maximum temperatures of the beam and deck assembly are within the criterion for passage of ASTM E119 for 120 minutes.

OPERATION OF THE PRESENT INVENTION

In use, the thermal protection wrapping system 10 of the preferred embodiment, as shown in FIGS. 1 through 10, includes a plurality of sections 70 and 72 that are located side by side on the structural steel column 14 to form the continuous thermal protection wrapping system 10. The user first places an inner fourth layer 52 to surround and attach to the structural steel element/beam 14, as shown in FIGS. 1 to 6 of the drawings. The installer places the inner surface wall 56 of the metal foil layer 52 circumjacently to the outer surface wall 16 of the structural steel beam 14. The installer cuts the circumference (width) of the inner fourth layer 52, as shown in FIGS. 3 and 6, such that when the metal foil layer 52 has encircled the steel beam 14, the perimeter wall edges 58b and 58d, and the perimeter wall edges 58b' and 58d' which meet or overlap to form horizontal overlap joints 60h and 60h'. The metal foil layer 52 is held in place by standard duct tape 17. This completes the first assembling step for forming the concentric composite laminate structure 20.

The installer in the next step uses the third inner layer 42 for surrounding the inner fourth layer 52 as shown in FIGS. 1 to 5 and 7 of the drawings. The installer places an inner surface wall 46 of the low conductivity blanket 42 circumjacently to the outer surface wall 54 of the metal foil fourth layer 52. The installer cuts the circumference (width) of the inner third layer as shown in FIGS. 3 and 7, such that when the low conductivity blanket layer has encircled the metal foil layer 52 and the perimeter wall edges 48b and 48d; and the perimeter wall edges which 48b' and 48d' meet or overlap to form horizontal overlap joints 50h and 50h' as shown in FIG. 7 of the drawings. The low conductivity blanket layer 42 is held in place by standard duct tape 17. This completes the second assembling step for forming the concentric composite laminate structure 20.

The installer in the next step uses the second layer 32 for surrounding the inner third layer 42, as shown in FIGS. 1 to 5 and 8 of the drawings. The installer places the inner surface wall 36 of the metal foil layer 32 circumjacently to the outer surface wall 44 of the conductive blanket layer 42. The installer cuts the circumference (width) of the inner second layer 32, as shown in FIGS. 3 and 8, such that when the metal foil layer 32 has encircled the low thermal conductivity blanket layer 42, the perimeter wall edges 38b and 38d; and the perimeter wall edges which 38b' and 38d' meet or overlap to form horizontal overlap joints 40h and 40h', as shown in FIG. 8 of the drawings. The metal foil layer 32 is held in place by standard duct tape 17. This completes the third assembling step for forming the concentric composite laminate structure 20.

The installer in the final step uses the outer layer 22 for surrounding the second layer 32, as shown in FIGS. 1 to 5 and 9 of the drawings. The installer places the inner surface wall 26 of the fire retardant outer layer 22 circumjacently to the outer surface wall 34 of the metal foil layer 32. The installer cuts the circumference (width) of the outer first layer 22, as shown in FIG. 9, such that when the fire retardant outer layer 22 has encircled the metal foil layer 32, the perimeter wall edges 28b and 28d; and the perimeter wall edges which 28b' and 28d' meet or overlap to form horizontal overlap joints 30h and 30h'. The fire retardant outer layer 22 is held in place by duct tape 17 and a series of spaced-apart metal constraint bands 18 which hold in place the plurality of formed sections 70 and 72 of the thermal protection wrapping system 10, as depicted in detail by FIGS. 1 and 9 of the drawings. This completes the final and fourth assembling step for forming the concentric composite laminate structure 20 of the continuous thermal protection wrapping system 10.

In a practical application of the assembling process, the four sheet layers 22, 32, 42 and 52 are pre-assembled into a layered sheet composite structure 20 having a rolled package assembly 20R by the manufacturer. This packaged composite rolled assembly 20R is delivered to the job site and can be installed as one assembly, in the same manner as the installer would install the fourth inner layer 52 circumjacent around the steel beam structure 14. The composite laminate rolled assembly 20R is shown being attached to the steel beam 14 in FIG. 10 of the drawings.

Figure 18:
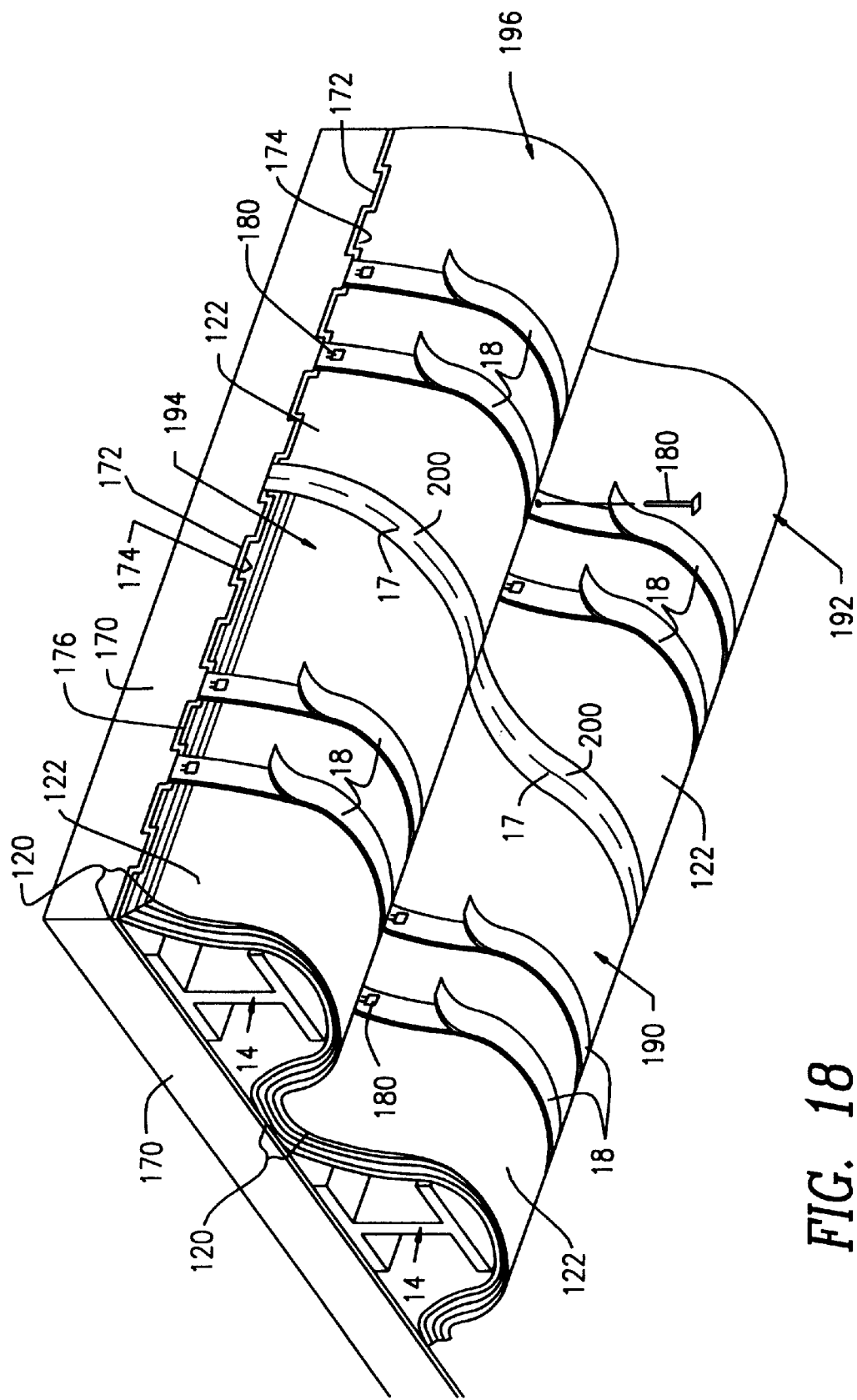
FIG. 18 is a bottom perspective view of the thermal protection wrapping system of the first alternate embodiment of the present invention showing a plurality of the composite laminate sheet structures in place and attached to the structural steel column and deck assembly in an assembled state.

If the steel structure 12 to be wrapped is a beam and deck assembly, the installer wraps the layered package assembly 120R around the steel beam 14 as shown in FIGS. 14 to 18 of the drawings. The outer layer 122 of the laminate assembly 120 is held in place by a series of spaced-apart metal constraint bands 18 which are pinned to the deck by bolt and pin members 180, as shown in FIGS. 16, 17 and 18, which hold in place the plurality of formed laminate sections 190, 192, 194 and 196 of the thermal protection wrapping system 100, as depicted in detail by FIGS. 17 and 18. Laminate sections 190 and 192; and laminate sections 194 and 196 abut with each other to form seam 200, wherein seam 200 is covered with duct tape 17 in order to keep laminate sections 190 and 192, as well as, laminate sections 194 and 196 together, as depicted in FIG. 18 of the drawings. Flute fillers 176 made of the low thermal conductivity blanket are inserted in the ridges or flute sections 174 of the deck assembly 172, between the steel decking 172 and the steel beam 14, as shown in FIGS. 17 and 18.

ADVANTAGES OF THE PRESENT INVENTION

Accordingly, an advantage of the present invention is that it provides for a fire and thermal protection wrapping system for wrapping structural steel columns, beams and open web joists associated with the construction of houses, buildings, factories, warehouses, airports, off shore drilling platforms, petro chemical facilities, and the like which is effective at continuously maintained temperatures up to 2300° F. for up to five hours (5 hrs) in duration.

Another advantage of the present invention is that it provides for a fire and thermal protection wrapping system that is easy to install, and can be used on all types of configurations which includes columns, beams and decks and open web joists of all types and sizes having joints, tees, oblique angles and the like.

Another advantage of the present invention is that it provides for a fire and thermal protection wrapping system that is relatively thin and light weight, and can easily be adapted on the job site to adapt to all types of steel structure configurations.

Another advantage of the present invention is that it provides for a fire and thermal protection wrapping system that is durable, and can be protected against severe environmental conditions of water, impact, temperature fluctuations of extreme hot and cold and humidity.

Another advantage of the present invention is that it provides for a fire and thermal protection wrapping system that has multiple industry facility applications for operational use that include: buildings; factories; warehouses; homes; coal, gas or oil generating plants; electrical and gas utilities; power generating stations; nuclear power generating facilities; power distribution stations; chemical and pharmaceutical manufacturing facilities; shipping and marine facilities; military installations; telecommunications facilities; airports and the like.

Another advantage of the present invention is that it provides for a fire and thermal protection wrapping system that includes a novel combination of radiation and heat reflection, low thermal conduction and high heat absorption.

Another advantage of the present invention is that it provides for a fire and thermal protection wrapping system that includes a concentric composite laminate structure having a plurality of concentric layers for the protection of structural steel components being wrapped.

Another advantage of the present invention is that it provides for a fire and thermal protection wrapping system that provides a plurality of protection layers including a heat reflection outer shell, an inner reflective lining, an inner low thermal conductive layer, and a metal foil layer surrounding the structural steel component.

Another advantage of the present invention is that it provides for a fire and thermal protection wrapping system that provides a plurality of protection layers including a heat reflection outer shell, an inner reflective lining and an inner low thermal conductive layer surrounding the structural steel component.

Another advantage of the present invention is that it provides for a fire and thermal protection wrapping system that provides a plurality of protection layers including a heat reflection outer shell, an inner reflective lining surrounding the structural steel component.

Another advantage of the present invention is that it provides for a fire and thermal protection wrapping system that can be easily applied and mass produced in an automated and economical manner, and is cost efficient for a variety of applications.

Another advantage of the present invention is that it provides for a fire and thermal protection wrapping system that is non-toxic, non-hazardous, environmentally safe and applied using all dry materials with no wet sprays, fibrous materials or airborne particles.

Another advantage of the present invention is that it provides for a fire and thermal protection wrapping system that can easily be removed and reinstalled to provide easy access to any cables, conduits or pipes that may be situated along the structural steel element.

A latitude modification, change and substitution is intended in the foregoing disclosure, and in some instances, some features of the invention will be employed without corresponding use of other features. Accordingly it is appropriate that the appended claims be construed broadly and in a manner consistent with the spirit and scope of the invention herein.

What is claimed is:

1. A fire and heat protection wrapping system for wrapping structural steel columns, steel beams, open web joists and other structural steel components used in the construction of an edifice, comprising:
   a) a concentric composite laminate structure having a plurality of concentric layers for the protection of the structural steel components which are exposed to high temperatures for up to five hours (5 hrs) in duration; said concentric composite laminate structure adapted for being attached to the structural steel component;
   b) said plurality of concentric layers including an outer first layer, an inner second layer, an inner third layer and an inner core fourth layer for wrapping the structural steel component;
   c) said outer first layer being a fiberglass textile having an intumescent coating for resistance to water, impact and heat; and said outer first layer surrounding said inner second layer and having an inner surface wall in contact with said inner second layer;
   d) said inner second layer being a metal foil layer for reflecting heat and eliminating the convection transfer of heat; and said inner second layer surrounding said inner third layer and having an inner surface wall in contact with said inner third layer;
   e) said inner third layer being a low conductivity refractory blanket for reducing the transmission of heat; and said inner third layer surrounding said inner fourth layer and having an inner surface wall in contact with said inner fourth layer; and
   f) said inner core fourth layer being a metal foil layer for reflecting heat and eliminating the convection transfer of heat; and said inner fourth layer surrounds the core structural steel component and having an inner surface wall in contact with the structural steel component.

2. A fire and heat protection wrapping system in accordance with claim 1, wherein said intumescent coating is a fire retardant coating consisting of a foaming agent, a blowing agent, a charring agent, a binding agent, a solvent and a pigment; and further including flame spread reduction agents, thermal transmission reductive agents, refractory fibers and stabilizers.

3. A fire and heat protection wrapping system in accordance with claim 2, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

4. A fire and heat protection wrapping system in accordance with claim 1, wherein said metal foil layer is in the form of sheets made from steel foil, stainless steel foil, aluminum foil, copper foil or tantalum foil.

5. A fire and heat protection wrapping system in accordance with claim 1, wherein said low thermal conductivity refractory blanket layer is selected from the group consisting of ceramic fiber blankets; silicon dioxide and calcium oxide fiber blankets; silicon dioxide and alumina fiber blankets; high silica fiber blankets; fiberglass blankets; mineral wool and rock wool blankets.

6. A fire and heat protection wrapping system in accordance with claim 1, further including connection means having a plurality of metal restraining belts.

7. A fire and heat protection wrapping system in accordance with claim 1, wherein said inner second layer is a metal foil layer made of steel foil.

8. A fire and heat protection wrapping system in accordance with claim 1, wherein said inner core fourth layer is a metal foil layer made of aluminum foil.

9. A fire and heat protection wrapping system in accordance with claim 1, wherein said concentric composite laminate structure is pre-assembled and formed into a layered sheet composite structure having a rolled package assembly formed thereof for a one-step application of said protection wrapping system onto a steel component.

10. A fire and heat protection wrapping system for wrapping of steel columns, steel beams, open web joists and steel decking assemblies used in with the construction of roadways, bridges and multi-story parking garages, comprising:
    a) a composite laminate structure having a plurality of layers adapted to be connected to the steel columns, steel beams, open web joists and steel decking assemblies which are exposed to high temperatures for up to five (5) hours in duration;
    b) said plurality of layers including an outer sheet layer, and three inner sheet layers arranged in any order, for covering the steel columns, steel beams, open web joists, and steel decking assemblies;
    c) said outer layer being a fiberglass textile having an intumescent coating for resistance to fire, heat, water, and impact;
    d) two of said three inner layers being a metal foil layer for reflecting heat and eliminating the convection transfer of heat; and
    e) one of said three inner layers being a low thermal conductivity refractory blanket for reducing the transmission of heat.

11. A fire and heat protection wrapping system in accordance with claim 10, wherein said intumescent coating is a fire retardant coating consisting of a foaming agent, a blowing agent, a charring agent, a binding agent, a solvent and a pigment; and further including flame spread reduction agents, thermal transmission reductive agents, refractory fibers and stabilizers.

12. A fire and heat protection wrapping system in accordance with claim 11, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

13. A fire and heat protection wrapping system in accordance with claim 10, wherein said metal foil layer is in the form of sheets made from steel foil, stainless steel foil, aluminum foil, copper foil or tantalum foil.

14. A fire and heat protection wrapping system in accordance with claim 10, wherein said low thermal conductivity refractory blanket is selected from the group consisting of ceramic fiber blankets; silicon dioxide and calcium oxide fiber blankets; silicon dioxide and alumina fiber blankets; high silica fiber blankets; fiberglass blankets; mineral wool and rock wool blankets.

15. A fire and heat protection wrapping system in accordance with claim 10, further including connection means having a plurality of metal restraining belts or a plurality of pin and bolt members or combinations thereof.

16. A fire and heat protection wrapping system in accordance with claim 10, wherein one of said inner layers is a metal foil layer made of steel foil.

17. A fire and heat protection wrapping system in accordance with claim 10, wherein one of said inner layers is a metal foil layer made of aluminum foil.

18. A fire and heat protection wrapping system in accordance with claim 10, wherein said composite laminate structure is pre-assembled and formed into a layered sheet composite structure having a rolled package assembly formed thereof for a one-step application of said protection wrapping system onto steel columns, steel beams, open web joists and steel decking assemblies.

19. A fire and heat protection wrapping system for wrapping of steel columns, steel beams, open web joists and steel decking assemblies used in the construction of roadways, bridges, and multi-story parking garages, comprising:
    a) a composite laminate structure having a plurality of layers for connecting to the steel columns, steel beams, open web joists and steel decking assemblies by connection means which are exposed to high temperatures for up to five (5) hours in duration;
    b) said plurality of layers including an outer layer, an inner second layer, an inner third layer and an inner core fourth layer for covering the steel columns, steel beams, open web joists, and steel decking assemblies;
    c) said outer layer being a fiberglass textile having an intumescent coating for resistance to fire, heat, water, and impact;
    d) said inner second layer being a metal foil layer for reflecting heat and eliminating the convection transfer of heat;
    e) said inner third layer being a low thermal conductivity refractory blanket for reducing the transmission of heat; and
    f) said inner core fourth layer being a metal foil layer and said inner core fourth layer having an inner surface wall in contact with the structural steel column and steel decking assembly.

20. A fire and heat protection wrapping system in accordance with claim 19, wherein said intumescent coating is a fire retardant coating consisting of a foaming agent, a blowing agent, a charring agent, a binding agent, a solvent and a pigment; and further including flame spread reduction agents, thermal transmission reductive agents, refractory fibers and stabilizers.

21. A fire and heat protection wrapping system in accordance with claim 20, wherein said intumescent coating further includes mechanical enhancer components for physical impact resistance and adhesion enhancement; water resistance agents and efflorescence reduction agents; and elasticity agents to increase resistance to cracking and shrinking, and to improve ease of spraying and coating.

22. A fire and heat protection wrapping system in accordance with claim 19, wherein said metal foil layer is in the form of sheets made from steel foil, stainless steel foil, aluminum foil, copper foil or tantalum foil.

23. A fire and heat protection wrapping system in accordance with claim 19, wherein said low thermal conductivity refractory blanket is selected from the group consisting of ceramic fiber blankets; silicon dioxide and calcium oxide fiber blankets; silicon dioxide and alumina fiber blankets; high silica fiber blankets; fiberglass blankets; mineral wool and rock wool blankets.

24. A fire and heat protection wrapping system in accordance with claim 19, further including connection means having a plurality of metal restraining belts, or a plurality of pin and bolt members, or combinations thereof.

25. A fire and heat protection wrapping system in accordance with claim 19, wherein said inner second layer is a metal foil layer made of steel foil.

26. A fire and heat protection wrapping system in accordance with claim 19, wherein said inner core fourth layer is a metal foil layer made of aluminum foil.

27. A fire and heat protection wrapping system in accordance with claim 19, wherein said composite laminate structure is pre-assembled and formed into a layered sheet composite structure having a rolled package assembly formed thereof for a one-step application of said protection wrapping system onto steel columns, steel beams, open web joists and steel decking assemblies.

28. A fire and heat protection wrapping system for wrapping structural steel columns, steel beams, open web joists and other structural steel components used in the construction of an edifice, comprising:
    a) a concentric composite laminate structure having a plurality of concentric layers for the protection of the structural steel components which are exposed to high temperatures for up to five hours (5 hrs) in duration; said concentric composite laminate structure adapted for being attached to the structural steel component;
    b) said plurality of concentric layers including an outer first layer, an inner second layer, and an inner core third layer for wrapping the structural steel component;
    c) said outer first layer being a fiberglass textile having an intumescent coating for resistance to water, impact and heat; and said outer first layer surrounding said inner second layer and having an inner surface wall in contact with said inner second layer;
    d) said inner second layer being a metal foil layer for reflecting heat and eliminating the convection transfer of heat; and said inner second layer surrounding said inner core third layer and having an inner surface wall in contact with said inner core third layer; and
    e) said inner core third layer being a low conductivity refractory blanket for reducing the transmission of heat; and said inner core third layer surrounding the structural steel component and having an inner surface wall in contact with the structural steel component.

29. A fire and heat protection wrapping system in accordance with claim 28, wherein said inner second layer is a metal foil layer made of steel foil.

30. A fire and heat protection wrapping system in accordance with claim 28, wherein said low thermal conductivity refractory blanket layer is selected from the group consisting of ceramic fiber blankets; silicon dioxide and calcium oxide fiber blankets; silicon dioxide and alumina fiber blankets; high silica fiber blankets; fiberglass blankets; mineral wool and rock wool blankets.

31. A fire and heat protection wrapping system for wrapping structural steel columns, steel beams, open web joists and other structural steel components used in the construction of an edifice, comprising:
    a) a concentric composite laminate structure having at least two concentric layers for the protection of the structural steel components which are exposed to high temperatures for up to five hours (5 hrs) in duration; said concentric composite laminate structure adapted for being attached to the structural steel component;
    b) said at least two concentric layers including an outer first layer and an inner core second layer for wrapping the structural steel component;
    c) said outer first layer being a fiberglass textile having an intumescent coating for resistance to water, impact and heat; and said outer first layer surrounding said inner core second layer and having an inner surface wall in contact with said inner core second layer; and
    d) said inner core second layer being a metal foil layer for reflecting heat and eliminating the convection transfer of heat; and said inner core second layer surrounding the structural steel component and having an inner surface wall in contact with the structural steel component.

32. A fire and heat protection wrapping system in accordance with claim 31, wherein said inner core second layer is a metal foil layer made of steel foil.

33. A fire and heat protection wrapping system in accordance with claim 31, wherein said concentric composite laminate structure further includes an inner third layer being a low conductivity refractory blanket for reducing the transmission of heat; said inner third layer surrounding the structural steel component and having an inner surface wall in contact with the structural steel component; and said inner core second layer surrounding said inner third layer.

34. A fire and heat protection wrapping system for wrapping of steel columns, steel beams, open web joists and steel decking assemblies used in the construction of roadways, bridges, and multi-story parking garages, comprising:
    a) a composite laminate structure having a plurality of layers adapted for connecting to the steel columns, steel beams, open web joists and steel decking assemblies which are exposed to high temperatures for up to five (5) hours in duration;
    b) said plurality of layers including an outer layer, an inner second layer, and an inner core third layer for covering the steel columns, steel beams, open web joists, and steel decking assemblies;
    c) said outer layer being a fiberglass textile having an intumescent coating for resistance to fire, heat, water, and impact;
    d) said inner second layer being a metal foil layer for reflecting heat and eliminating the convection transfer of heat; and
    e) said inner core third layer being a low thermal conductivity refractory blanket for reducing the transmission of heat; and said inner core third layer having an inner surface wall in contact with the structural steel column and steel decking assembly.

35. A fire and heat protection wrapping system in accordance with claim 34, wherein said inner second layer is a metal foil layer made of steel foil.

36. A fire and heat protection wrapping system in accordance with claim 34, wherein said low thermal conductivity refractory blanket layer is selected from the group consisting of ceramic fiber blankets; silicon dioxide and calcium oxide fiber blankets; silicon dioxide and alumina fiber blankets; high silica fiber blankets; fiberglass blankets; mineral wool and rock wool blankets.

37. A fire and heat protection wrapping system for wrapping of steel columns, steel beams, open web joists and steel decking assemblies used in the construction of roadways, bridges, and multi-story parking garages, comprising:

a) a composite laminate structure having at least two layers adapted for connecting to the steel columns, steel beams, open web joists and steel decking assemblies which are exposed to high temperatures for up to five (5) hours in duration;

b) said at least two layers including an outer layer, and an inner core second layer for covering the steel columns, steel beams, open web joists, and steel decking assemblies;

c) said outer layer being a fiberglass textile having an intumescent coating for resistance to fire, heat, water, and impact; and d) said inner core second layer being a metal foil layer for reflecting heat and eliminating the convection transfer of heat; and said inner core second layer having an inner surface wall in contact with the structural steel column and steel decking assembly.

38. A fire and heat protection wrapping system in accordance with claim 37, wherein said inner core second layer is a metal foil layer made of steel foil.

39. A fire and heat protection wrapping system in accordance with claim 37, wherein said concentric composite laminate structure further includes an inner third layer being a low conductivity refractory blanket for reducing the transmission of heat; said inner third layer surrounding the structural steel component and having an inner surface wall in contact with the structural steel component; and said inner core second layer surrounding said inner third layer.

* * * * *